Oct. 11, 1927.

L. BLACKMORE

MOTOR VEHICLE

Filed June 16, 1924     2 Sheets-Sheet 1

1,644,708

Inventor
Lloyd Blackmore

Oct. 11, 1927.

L. BLACKMORE

MOTOR VEHICLE

Filed June 16, 1924

Inventor

Lloyd Blackmore.

Patented Oct. 11, 1927.

1,644,708

UNITED STATES PATENT OFFICE.

LLOYD BLACKMORE, OF HIGHLAND PARK, MICHIGAN, ASSIGNOR TO GENERAL MOTORS CORPORATION, OF DETROIT, MICHIGAN, A CORPORATION OF DELAWARE.

MOTOR VEHICLE.

Application filed June 16, 1924. Serial No. 720,327.

This invention relates to motor vehicles, and is illustrated as embodied in a vehicle having common operating connections for a valve in the fuel-supplying connections, as for example the usual choke valve, and for a device controlling the engine-cooling means, which device may be a valve in the water-circulating system, a radiator shutter, a clutch for the fan, or a shutter for the conduits of an air-circulating system. Preferably the operating connections operate successively on the cooling device, and on the choke valve or its equivalent, so that the cooling device may be operated independently of the choke valve.

The various novel features of the invention, which are particularly pointed out in the appended claims, will be apparent from the following description of several illustrative embodiments shown in the accompanying drawings, in which:

Figure 1:
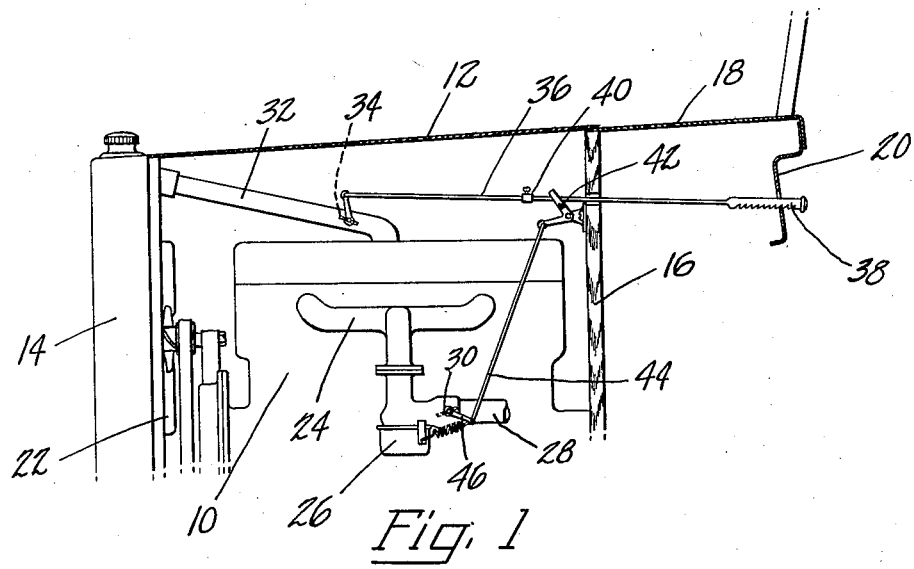
Figure 1 is a diagrammatic side elevation of part of a motor vehicle having common controlling means for the choke valve and the water cooling system.

In the arrangement shown in Figure 1, there is an engine 10 under a hood 12 extending from a radiator 14 to a dash 16 at the front of the cowl 18, the cowl carrying an instrument board 20 in the usual driver's compartment. The engine drives the usual fan 22, and has fuel-supplying means including a manifold 24 and a carbureter 26 with an air intake 28 having a choke valve 30 of any usual or desired form. The engine also has a cooling system including a water jacket with a lower connection (not shown) from the radiator, and with an upper connection 32 to the water jacket. Where the same parts appear in Figures 2, 3, and 4 they are indicated by the same reference characters.

According to the present invention, a valve 34 in connection 32 is arranged to be operated by a rod 36 to restrict or shut off the circulation of the cooling water in warming up the engine. Rod 36 has an operating handle 38 formed with ratchet teeth to engage the lower edge of an opening in instrument board 20 to hold it in any desired position of adjustment. The rod 36 also carries an adjustable stop 40 which engages, after sufficient lost motion to restrict passage 32, a bellcrank lever 42 on the dash 16, the bellcrank lever operating choke valve 30 by means of a link 44 connected to an arm 46. Thus the water circulation may be restricted without operating the choke valve, while a single control member operates both valves 30 and 34.

Figure 2:
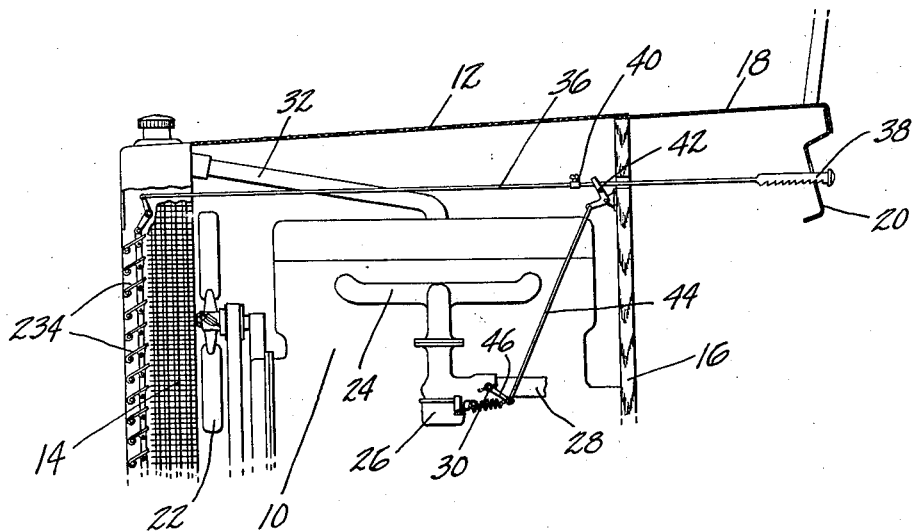
Figure 2 is a similar view of part of an automobile having common controlling means for the choke valve and the radiator shutter.
Figure 3:
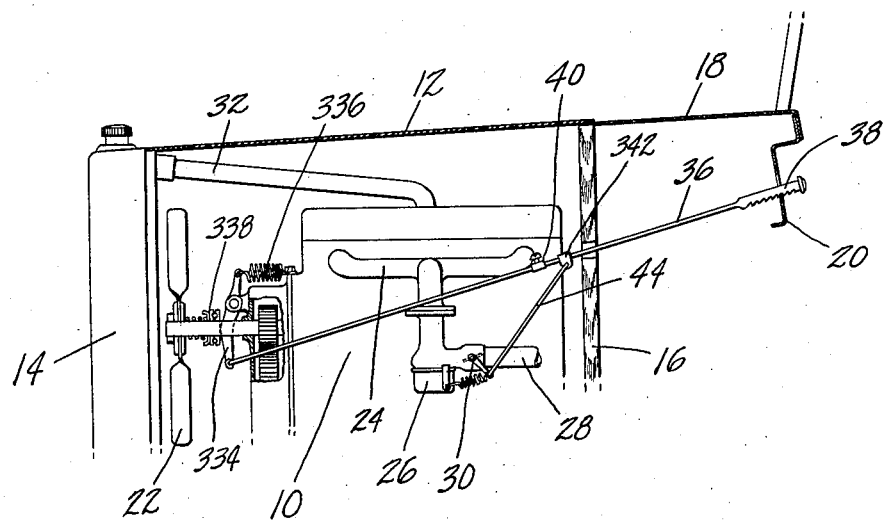
Figure 3 is a similar view of part of an automobile having common controlling means for the choke valve and a fan clutch.
Figure 4:
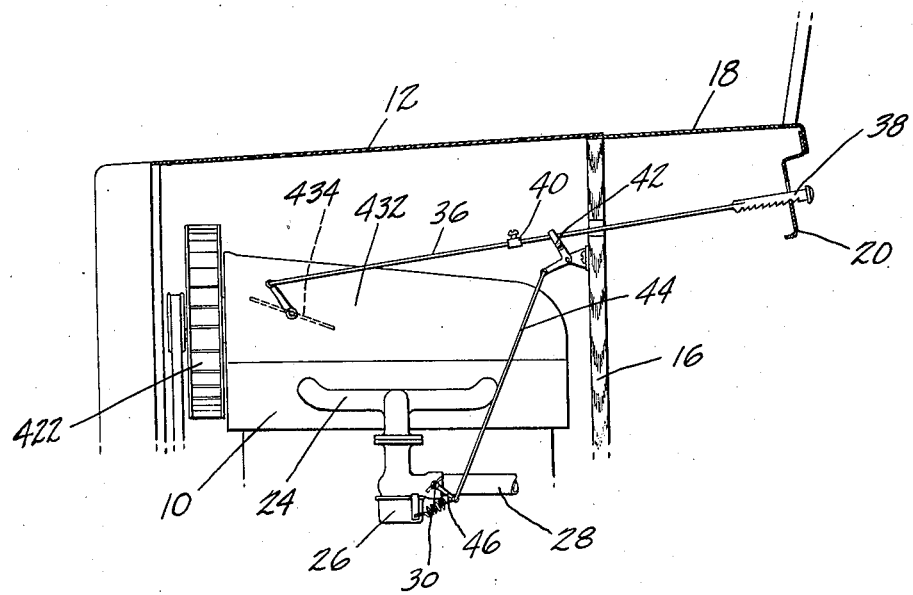
Figure 4 is a similar view of part of an automobile having common controlling means for the choke valve and a shutter for an air cooling system.

In the modification shown in Figure 2, rod 36 operates a radiator shutter having interconnected pivoted leaves 234, and which controls the flow of cooling air past the radiator 14 and the engine 10. The rod 36 carries the stop 40 operating the choke valve 30, as before. In Figure 3 the rod 36 operates a lever 334 against the resistance of a spring 336 to relieve the pressure on a friction or slipping clutch 338 for the fan 22, thus stopping or slowing up the fan before operation of the choke valve. The link 44 in this modification is directly connected to a sleeve 342 on rod 36, which is engaged by the stop 40. In Figure 4 the rod 36 operates a shutter 434 in a passage 432 forming part of a circulation system for cooling air, which includes an air-circulating fan 422 discharging radially air which has passed about the engine cylinders. It will be noted that in the modifications of Figures 2, 3, and 4 the operating member 36 controls a current of air, and that in the modifications of Figures 2 and 4 the air is directly controlled by a shutter.

While several illustrative embodiments of the invention have been described in detail, it is not my intention to limit its scope to these particular embodiments, or otherwise than by the terms of the appended claims.

I claim:

1. In a motor vehicle, an engine, a device for controlling the temperature of the engine, a mechanism controlling the fuel mixture supply to the engine, a single control means, a positive connection between said control means and said device, and a lost motion connection between said control means and said mechanism.

2. A motor vehicle comprising, in combination, an engine, a device for controlling the temperature of the engine, a device for controlling the fuel mixture supplied to the engine, and a single operating member directly connected to the first device and having lost-motion connection with the second device.

3. A motor vehicle comprising, in combination, an engine having a choke valve, means for cooling the engine, a device controlling the effect of the cooling means on the engine, an operating member for said device, and a lost-motion connection from said member to the choke valve.

4. A motor vehicle comprising, in combination, an engine having a choke valve, means for cooling the engine, a device controlling the effect of the cooling means on the engine, an operating member for said device, a stop on the operating member, and a connection to the choke valve operated by the stop.

5. A motor vehicle comprising, in combination, an engine having fuel-supplying means with a control valve, means to direct a current of cooling air past the engine, an operating member for the air-directing means, and a lost-motion connection from the operating member to the control valve.

6. A motor vehicle comprising, in combination, a driver's compartment, an engine having fuel-supplying means with a valve, a radiator and a radiator shutter, a shutter-operating rod accessible from the driver's compartment, a stop on the rod and a valve operating connection operated by the stop for controlling said valve.

7. An engine, cooling means therefor, fuel mixture supplying means, a device to control the action of the cooling means, mechanism to control the fuel mixture supply means and a single control means to operate said device and mechanism, whereby the device is first operated and thereafter the mechanism.

In testimony whereof I affix my signature.

LLOYD BLACKMORE.